B. A. GODEK.
ELASTIC TIRE FOR VEHICLE WHEELS.
APPLICATION FILED NOV. 11, 1907. RENEWED APR. 12, 1910.

961,955. Patented June 21, 1910.

UNITED STATES PATENT OFFICE.

BOLESLAS ANDRÉ GODEK, OF PARIS, FRANCE.

ELASTIC TIRE FOR VEHICLE-WHEELS.

961,955.   Specification of Letters Patent.   Patented June 21, 1910.

Application filed November 11, 1907, Serial No. 401,711.   Renewed April 12, 1910.   Serial No. 555,102.

*To all whom it may concern:*

Be it known that I, BOLESLAS ANDRÉ GODEK, a subject of the Emperor of Russia, residing at Paris, France, have invented new and useful Improvements in Elastic Tires for Vehicle-Wheels, of which the following is a specification.

This invention relates to a pneumatic air tire, the construction of which is characterized by the special arrangement of the joint of the metallic air-chamber and by the special arrangement of several constructional details. With this improved elastic tire the india-rubber tread and the india-rubber air-tire, as they are used at present with elastic wheels are entirely done away with.

Figure 1:
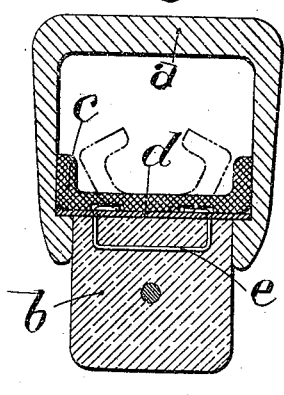
Figure 2:
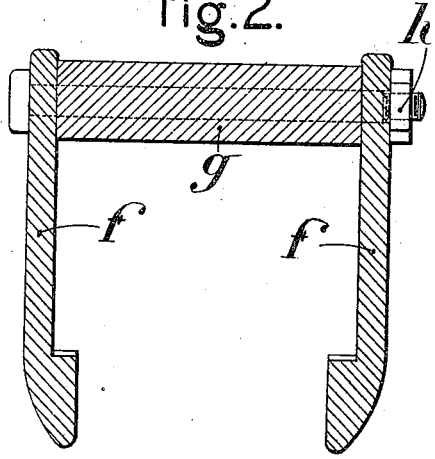
Figure 3:
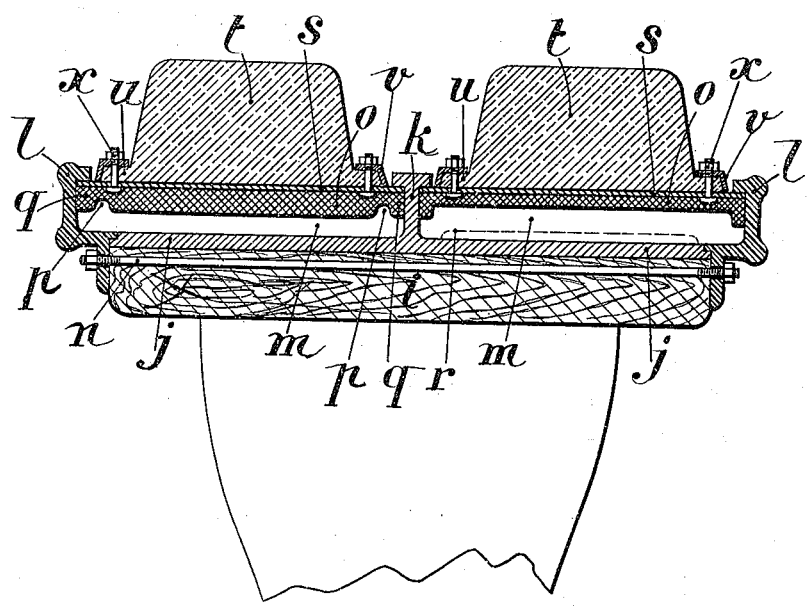
Figure 4:
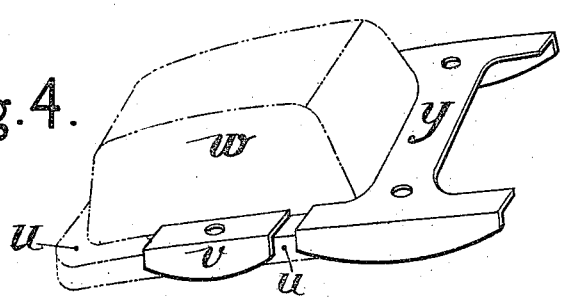

In the drawings Figure 1 represents a cross section through the felly with the elastic tire. Fig. 2 shows a modified construction of the elastic tire. Fig. 3 is a cross-section through a double-felly for large wheels. Fig. 4 is a view representing the manner of mounting the blocks of india-rubber which externally are fitted in the felly.

Referring to Fig. 1, $a$ is the felly made from aluminium or other metal, which is very concave and in which the tire $b$ is located which is made from india-rubber, blocks of vulcanized fabric, leather or other suitable material.

The pneumatic joint is constituted of a band of leather, india-rubber or other suitable material, which band $c$ must be flexible so that it can be bent as indicated in dotted lines to be inserted in the felly. The band $c$ adheres under the pressure of the air to the side walls of the felly $a$ and prevents the escape of the air inclosed in said felly. A flexible steel band $d$ forms the fourth side of the felly, which thus represents an air chamber which is entirely formed of metal. The steel band $d$ is fixed to the tread $b$ to prevent the tearing off of this tread or its getting out of the felly. The steel band $d$ and the tread $b$ can be connected through metal clamps $e$ as shown by way of example in Fig. 1, but any other device for attaching the two parts can be used.

It is evident, that under the load of the vehicle, the part of the tire or better of the tread which comes in contact with the road, will forcibly be pushed back into the felly; but as soon as in consequence of the revolving of the wheel this part gets out of contact with the road, this part of the tire returns to its original position under the internal pressure.

To reduce the friction, a certain quantity of oil or lubricant can be introduced in the felly. An ordinary valve can serve for filling in the oil, the air under pressure or any other liquid under pressure.

To prevent excessive flattening of the tire which could result from shocks and further to permit the use of the tire even if the joint should get out of order, blocks of elastic material, india-rubber for example, can be provided in the hollow felly, which may be of any suitable shape and serve for softening the shocks.

There could, in certain cases, fellies be made which consist of three separate metallic parts $f, f, g$ (Fig. 2) solidly connected through bolts $h$.

When to be applied to very large wheels for heavy vehicles the felly can be composed of two air-chambers which are adjacent (Fig. 3). With this object in view, the rim $i$ of the wheel is covered by an iron hoop $j$ having a projection $k$ at its middle which is T shaped and thus forms a partition with lateral flanges at the upper end. Removable rings $l, l$ are fixed against the sides of the rim $i$ and the edges of hoop $j$ which complete the two air-chambers $m, m$. These rings $l, l$ are connected by cross bolts $n$ which pass through the rim $i$. The band $o$ which forms the pneumatic joint can be of leather or india-rubber. If it is made from leather (left hand side of Fig. 1), it will preferably be provided with two lateral longitudinal grooves $p$ which give the required elasticity to the edges of the leather band for forming a good joint, the body of this band being of the same thickness as the edges $q$ so that, when the tire gets out of order these edges will not have to support the entire load. With the same object in view the band $o$ could be made without the lateral grooves (right hand side part of Fig. 3), but in this case a buffer $r$ will be arranged on the bottom of the air-chamber.

When the bands $o$ are of india-rubber they can be made with or without grooves, as has just been described with reference to the leather bands, they can however be made much simpler from india-rubber of uniform thickness, in which case they ought to be much larger than the air-chamber so that the bands have to be compressed to be inserted in the air-chambers. The inner pressure compressing said bands assures a perfect lateral contact and the excess in width compensates the wear which happens in time.

The steel bands *s* of the air-chambers have external covers *t* of india-rubber which form the tread. This cover can consist for each of the steel bands *s* of a continuous strip or of separate blocks. These strips or blocks have lateral flanges *u* which serve for fixing the blocks on the steel bands *s*, by means of angle irons *v* (Figs. 3 and 4), one shank of the iron serving for fixing the flange *u* on the steel band and the other shank terminating in a curved edge to prevent the crushing of said flange. This curved shape is necessary with regard to the concave cross section assumed by the steel bands when the tread is pushed back. When the tread is composed of separate blocks *w* (Fig. 4), H shaped iron clamps *y* are used besides the angle irons *v* the clamps *y* being inserted between two adjacent blocks. Said clamps *y* are fixed by means of screw bolts *x*.

What I claim as my invention and desire to secure by Letters Patent is:—

1. An elastic tire for vehicle wheels comprising in combination an air chamber made from metal consisting of the hollow felly and an outer flexible steel band closing the open outer end of said felly, a band of india-rubber placed in the open end of the felly under the steel band so that its edges are tightly pressed against the side walls of the felly through the action of the compressed air contained in the felly, and a tread of suitable elastic material fixed to the outer surface of the steel band, substantially as described and shown and for the purpose set forth.

2. An elastic tire for vehicle wheels comprising in combination with the metallic air-chamber formed by the hollow felly, an outer steel band closing the open end of the felly and an india-rubber band in said open end of the felly under the steel band, a central partition consisting of a T shaped vertical projection of the felly for forming two adjacent but separate air-chambers in the tire, substantially as described and shown and for the purpose set forth.

BOLESLAS ANDRÉ GODEK.

Witnesses:
 HANSON C. COXE,
 OSCAR SCHROEDER.